United States Patent

[11] 3,634,820

| | | |
|---|---|---|
| [72] | Inventor | Harold Birtwistle<br>Burnley, England |
| [21] | Appl. No. | 864,597 |
| [22] | Filed | Oct. 8, 1969 |
| [45] | Patented | Jan. 11, 1972 |
| [73] | Assignee | Joseph Lucas (Industries) Limited<br>Birmingham, England |
| [32] | Priority | Oct. 14, 1968 |
| [33] | | Great Britain |
| [31] | | 48,521/68 |

[54] LAMP FAILURE WARNING CIRCUITS FOR ROAD VEHICLES
4 Claims, 2 Drawing Figs.

[52] U.S. Cl. .................................... 340/52,
180/103, 140/251
[51] Int. Cl. .................................................. B60q 1/00
[50] Field of Search.......................................... 340/52 F,
52 R, 251, 67, 80, 59; 180/103

[56] References Cited
UNITED STATES PATENTS

| | | | |
|---|---|---|---|
| 2,329,502 | 9/1923 | Withrow...................... | 340/59 |
| 2,540,410 | 2/1951 | Wagner........................ | 340/251 |
| 2,904,774 | 9/1959 | Bossarte...................... | 340/52 R |
| 3,350,684 | 10/1967 | Turner......................... | 340/80 |
| 3,457,561 | 7/1969 | Zeisler......................... | 340/251 |

*Primary Examiner*—John W. Caldwell
*Assistant Examiner*—Glen R. Swann, III
*Attorney*—Holman, Glascock, Downing & Seebold ABSTRACT: A lamp failure warning circuit for a road vehicle includes a warning lamp, a first relay coil in series with a lamp to be tested and a first pair of normally open contacts in series with and operable by the relay coil upon failure of the lamp to be tested, the first pair of normally open contacts are closed and the warning lamp is operated. The circuit further includes a second pair of normally open contacts in series with the warning lamp and operable by a second relay coil to illuminate the warning lamp at the same time as an intermittently operable lamp on the vehicle is illuminated.

3,634,820

LAMP FAILURE WARNING CIRCUITS FOR ROAD VEHICLES

BACKGROUND OF THE INVENTION

This invention relates to lamp failure warning circuits for road vehicles.

SUMMARY OF THE INVENTION

A lamp failure warning circuit according to the invention includes a warning lamp, means operable upon failure of a lamp to be tested for illuminating the warning lamp, and further means operable to illuminate the warning lamp at the same time as an intermittently operable lamp on the vehicle is illuminated.

Typically, the lamp to be tested would be a side lamp or tail lamp, so that illumination of the warning lamp indicates that the side or tail lamp has failed. The intermittently operated lamp could be a brake lamp, so that the warning lamp would also be illuminated at the same time as the brake lamp, to give an indication that the warning lamp is operating satisfactorily, and also that the brake lamps are operating satisfactorily.

BRIEF DESCRIPTION OF THE DRAWING

In the accompanying drawings.

DESCRIPTION OF THE PREFERRED EMBODIMENTS

Figure 1:
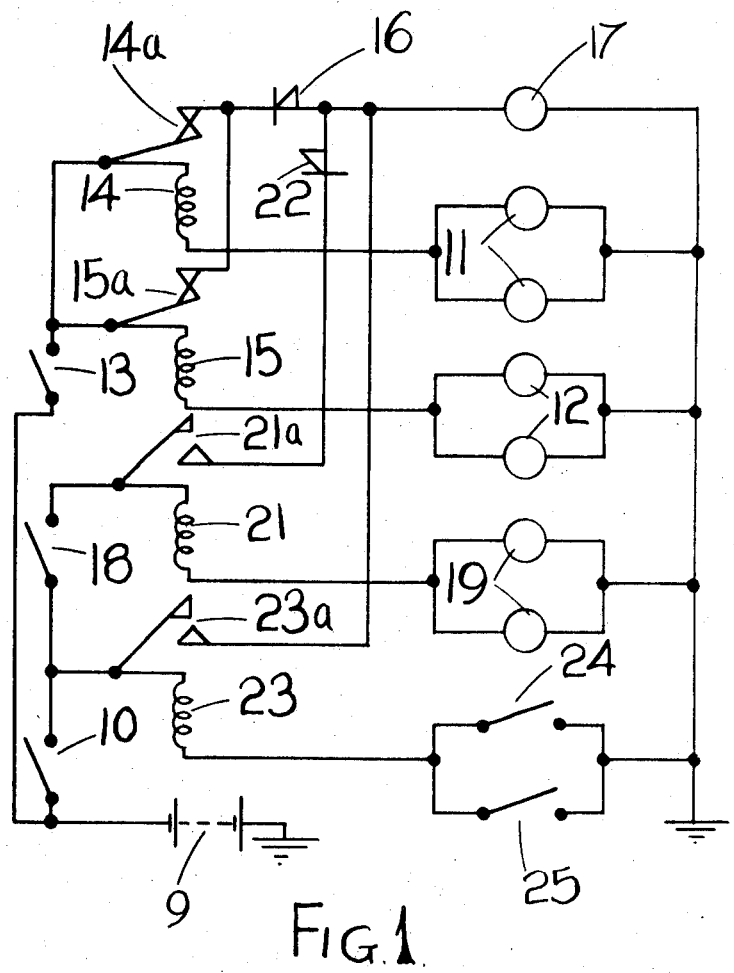
FIGS. 1 and 2 are circuit diagrams illustrating two examples of the invention.

Referring first to FIG. 1, the vehicle battery 9 has its positive terminal earthed and its negative terminal connected through the lighting switch 13 of the vehicle to one end of each of a pair of relay coils 14, 15. The other end of the coil 14 is earthed through the side lamps 11 of the vehicle in parallel, and the other end of the coil 15 is earthed through the tail lamps 12 of the vehicle in parallel. The coils 14 and 15 are then energized so as to open respectively a pair of contacts 14a and 15a, each of which when in its closed position completes a circuit through the switch 13 and a diode 16 to a warning lamp 17.

The negative battery terminal is further connected through the ignition switch 10 and the brake lamp switch 18 of the vehicle to one end of a relay coil 21, the other end of the coil 21 being connected to earth through the brake lamps 19 of the vehicle in parallel. The coil 21 when energized closes a normally open contact 21a which when closed completes an alternative circuit to the lamp 17 by way of the switches 10 and 18 and a diode 22. The junction between the switches 10 and 18 is further connected to one end of a relay coil 23, the other end of which is earthed through a pair of switches 24 and 25 in parallel. The switch 24 closes when the handbrake is applied, and the switch 25 closes when the brake fluid level falls below a predetermined value. The coil 23, when energized, closes a contact 23a which completes a third circuit to the lamp 17 by way of the switch 10.

When the lighting switch 13 is closed, current flows through the coils 14 and 15 to energize the lamps 11 and 12, and as long as the lamps 11 and 12 are operating satisfactorily, the contacts 14a and 15a open so that the lamp 17 is extinguished. If one of the lamps 11 or 12 fails, current will still flow to the other lamp through the appropriate coil 14 or 15, but the current flowing through the coil 14 or 15 will be insufficient to maintain the contact 14a or 15a open, so that the contact will close to complete a circuit by way of the diode 16 to the lamp 17, so indicating that one of the lamps 11 or 12 has failed.

Whenever the brakes of the vehicle are applied with the ignition switch 10 closed, then the lamps 19 are energized by of the coil 21, and the contact 21a closes completing a circuit by way of the diode 22 to the lamp 17, which is illuminated. In this way, every time the brake switch is closed in use, the lamp 17 will be illuminated, so indicating that the lamp 17 is operating satisfactorily. If one of the brake lamps 19 fails, there will be insufficient current flow through the coils 21 to operate the contact 21a, and so the lamp 17 will not be illuminated. It will be appreciated therefore that in the event of the lamp 17 failing to be illuminated on operation of the brakes, the driver will realize either that one of the brake lamps 19 has failed, or that the lamp 17 has failed.

When the driver first closes the ignition switch 10 with a view to starting the vehicle, then if the handbrake is applied the switch 24 will be closed and the coil 23 will be energized to close the contact 23a and illuminate the warning lamp 17 to give the driver a warning that the handbrake is still applied. When the handbrake is released, the warning lamp 17 should be extinguished, but in the event that the level of the brake fluid is too low, the lamp 17 will remain energized, so giving a warning to the driver. It will of course be appreciated that if the lamp 17 fails to be illuminated when the brake switch 18 is closed, the driver can readily test to see whether it is the lamp 17 or one of the lamps 19 that has failed by releasing the brake switch 18 and applying the handbrake.

Figure 2:
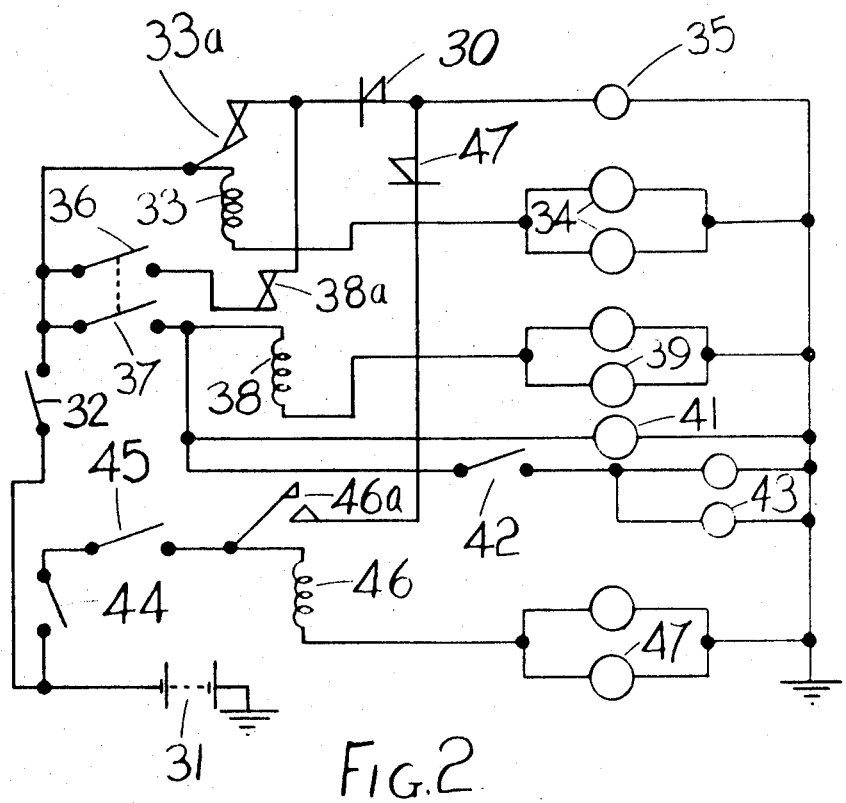

Referring now to the example shown in FIG. 2, a vehicle battery 31 has its positive terminal earthed and its negative terminal connected through the vehicle lighting switch 32 to one end of a relay coil 33 the other end of which is earthed through the offside side and tail lights 34 in parallel. The coil 33 when energized opens a pair of contacts 33a which when closed complete a circuit by way of the switch 32 and a diode 30 to a warning lamp 35. The vehicle further incorporates a parking switch having a pair of ganged contacts 36, 37. The switch 37 is connected in series with the switch 32 between the battery 31 and one end of a relay coil 38, the other end of which is connected to earth through the near-side side and tail lamps 39 in parallel. The coil 38 when energized opens a pair of contacts 38a connected in series with the switch 36 and the switch 32 between the battery and the cathode of the diode 30, so that an alternative path to the lamp 35 is completed when the contacts 38a are closed with the switches 36 and 32 closed. The switch 37 when closed also completes a circuit to the number plate lamp 41 of the vehicle, and through the panel light switch 42 to the panel lights 43 of the vehicle.

The negative battery terminal is further connected through the ignition switch 44 and the brake light switch 45 of the vehicle in series to one end of a relay coil 46, the other end of which is earthed through the brake lamps 47 of the vehicle in parallel. The coil 46, when energized, closes a contact 46a to complete a path to the lamp 35 by way of a diode 47. The diodes 30 and 47 serve in the same way as the diodes 16 and 22 in FIG. 1 to isolate the various circuits from one another.

Assuming for the moment that the vehicle is not parked, so that the switches 36 and 37 are closed, then the operation is similar to the circuit shown in FIG. 1. Before the lamps are operating satisfactorily, the lamp 35 is illuminated whenever the switch 45 is closed, but if one of the lamps 35 or 47 fails, then on closing of the switch 45 the lamp 35 will not be illuminated. If one of the lamps 34 or 39 fails, the lamp 35 will be illuminated as long as the switch 32 is closed.

When the vehicle is parked, the switches 36 and 37 are opened so that only the lamps 34 are illuminated. However, the connection of the contact 38a which will now be closed, in series with the switch 36 prevents the lamp 35 from being illuminated by way of the contact 38a.

Having thus described my invention what I claim as new and desire to secure by Letters Patent is:

1. A lamp failure warning circuit for a road vehicle, comprising in combination a battery having a live terminal and an earth terminal, first and second relay coils each having one end connected through the vehicle lighting switch to the live battery terminal, the other end of the first coil being connected to earth through the side lamps of the vehicle in parallel, and the other end of the second coil being connected to earth through the tail lamps of the vehicle in parallel, first and second parallel connected and normally closed contacts which are opened by the first and second coils respectively when both side lamps and both tail lamps respectively are illuminated, both the first and second contacts serving when closed to complete a circuit by way of the lighting switch and a diode to a warning lamp, a third relay coil connected to the live battery terminal through the brake lamp switch and the ignition switch of the vehicle in series, the other end of the third relay coil being connected to earth through the brake lamps of the vehicle in parallel, and the third relay coil serving when energized to close a third contact to complete a circuit by way of the ignition switch, the brake lamp switch, the third contact and a second diode to the warning lamp, the first and second diodes isolating the circuits from one another, and the arrangement being such that the warning lamp is illuminated whenever a side or tail lamp fails with the lighting switch closed, or whenever the brake lamps are operated with the ignition switch closed, provided neither brake lamp has failed.

2. A circuit as claimed in claim 1, including a fourth relay coil having one end connected to the live battery terminal through the ignition switch of a vehicle, and its other end connected to earth through a switch which is closed when the handbrake of the vehicle is applied, the fourth relay coil serving when energized to close a fourth contact to complete a circuit through the ignition switch to the warning lamp.

3. A circuit as claimed in claim 2 including an additional switch in parallel with the handbrake switch, the additional switch being closed when the brake fluid level falls below a predetermined value.

4. A lamp failure warning system for a road vehicle, comprising in combination a battery having a live terminal and an earthed terminal, a first relay coil having one end connected to the live battery terminal through the lighting switch of the vehicle and its other end connected to earth through the offside side and tail lamps in parallel, the first coil being energized only when both the offside side and tail lamps are illuminated, and serving when energized to open a contact which when closed completes a circuit by way of the lighting switch and a diode to a warning lamp, first and second ganged switches together constituting a parking light switch, the second switch serving when closed to complete a circuit by way of the lighting switch to one end of a second relay coil, the other end of which is connected to earth through the near-side side and tail lamps of the vehicle, the second relay coil being energized only when both near-side side and tail lamps are illuminated, and serving when closed to open a contact which in its closed condition completes a circuit by way of the lighting switch and the first switch through the diode to the warning lamp, and a third relay coil one end of which is connected to the live battery terminal through the brake lamp switch and the ignition switch of a vehicle in series and the other end of which is earthed through the brake lamps of the vehicle in parallel, the third relay coil being energized only when both brake lamps of the vehicle are illuminated and when energized serving to close a normally open contact which when closed completes a circuit by way of the ignition and brake light switches and a second diode to the warning lamp, the diodes isolating the warning lamp circuits from one another, the arrangement being such that the warning lamp is illuminated when an offside lamp or a near-side lamp fails provided that the first and second switches are closed, but is only illuminated when an offside lamp fails if the first and second switches are opened, the warning lamp in addition being illuminated each time the brake lamps are illuminated provided that both brake lamps are operating satisfactorily.

* * * * *